US012294059B1

(12) United States Patent
Zeng et al.

(10) Patent No.: US 12,294,059 B1
(45) Date of Patent: May 6, 2025

(54) BATTERY WITH DISCONTINUOUS BOND LAYER

(71) Applicant: Stacked Energy, Inc., San Jose, CA (US)

(72) Inventors: Qingcheng Zeng, San Jose, CA (US); Donald G. Dafoe, San Jose, CA (US)

(73) Assignee: Stacked Energy, Inc., San Jose, CA (US)

( * ) Notice: Subject to any disclaimer, the term of this patent is extended or adjusted under 35 U.S.C. 154(b) by 0 days.

(21) Appl. No.: 18/330,324

(22) Filed: Jun. 6, 2023

Related U.S. Application Data

(60) Continuation of application No. 17/353,059, filed on Jun. 21, 2021, now Pat. No. 11,699,815, which is a division of application No. 16/108,522, filed on Aug. 22, 2018, now Pat. No. 11,043,703.

(60) Provisional application No. 62/564,560, filed on Sep. 28, 2017.

(51) Int. Cl.
*H01M 10/42* (2006.01)
*H01M 10/04* (2006.01)
*H01M 10/44* (2006.01)

(52) U.S. Cl.
CPC ... *H01M 10/4207* (2013.01); *H01M 10/0413* (2013.01); *H01M 10/4257* (2013.01); *H01M 10/441* (2013.01); *H01M 2010/4271* (2013.01)

(58) Field of Classification Search
CPC ......... H01M 10/4207; H01M 10/0413; H01M 10/4257; H01M 10/441; H01M 2010/4271
See application file for complete search history.

(56) References Cited

U.S. PATENT DOCUMENTS

| 4,317,864 A | 3/1982 | Strasser |
| 4,374,186 A | 2/1983 | McCartney et al. |
| 4,567,119 A | 1/1986 | Lim |

(Continued)

FOREIGN PATENT DOCUMENTS

| CN | 1620735 A | 5/2005 |
| CN | 101202355 A | 6/2008 |

(Continued)

OTHER PUBLICATIONS

U.S. Appl. No. 15/742,009, Final Office Action, Mailed on Aug. 19, 2020, 13 pages.

(Continued)

*Primary Examiner* — Daniel S Gatewood
(74) *Attorney, Agent, or Firm* — Fenwick & West LLP

(57) ABSTRACT

Batteries according to embodiments of the present technology may include a first battery cell including a first body characterized by a first length and a first width, and a first tab extending from an edge of the first body. The first tab may be characterized by a width less than the first width of the first body. The batteries may also include a second battery cell stacked below the first battery cell. The second battery cell may include a second body characterized by a second length and a second width, and a second tab extending from an edge of the second body. The second tab may be characterized by a width less than the second width of the second body. The second tab may also be characterized by a width greater than the width of the first tab providing an extension of the second tab protruding from below the first tab.

20 Claims, 3 Drawing Sheets

(56) References Cited

U.S. PATENT DOCUMENTS

| | | |
|---|---|---|
| 5,162,169 A | 11/1992 | Tomantschger et al. |
| 5,162,172 A | 11/1992 | Kaun |
| 5,254,415 A | 10/1993 | Williams et al. |
| 5,367,431 A | 11/1994 | Kunishi et al. |
| 6,004,698 A | 12/1999 | Richardson et al. |
| 8,124,266 B2 | 2/2012 | Yamazaki |
| 8,153,410 B2 | 4/2012 | Jaffe |
| 8,357,469 B2 | 1/2013 | Shaffer, II et al. |
| 8,663,833 B2 | 3/2014 | Hosaka et al. |
| 9,142,811 B2 | 9/2015 | Chami |
| 10,916,741 B1 | 2/2021 | Dafoe et al. |
| 10,916,796 B1 | 2/2021 | Zeilinger et al. |
| 10,923,728 B1 | 2/2021 | Zeng |
| 11,018,343 B1 | 5/2021 | Dafoe et al. |
| 11,043,703 B1 | 6/2021 | Zeng et al. |
| 11,189,834 B1 | 11/2021 | Zeng |
| 11,228,074 B2 | 1/2022 | Kaye et al. |
| 11,296,361 B2 | 4/2022 | Chu et al. |
| 11,335,977 B1 | 5/2022 | Zeng et al. |
| 11,532,824 B2 | 12/2022 | Chu et al. |
| 11,588,155 B1 | 2/2023 | Erb et al. |
| 11,600,891 B1 | 3/2023 | Erb et al. |
| 11,677,120 B2 | 6/2023 | Erb et al. |
| 11,699,815 B1 | 7/2023 | Zeng et al. |
| 11,791,470 B2 | 10/2023 | Campbell et al. |
| 11,862,801 B1 | 1/2024 | Zeng |
| 11,888,112 B2 | 1/2024 | Kaye et al. |
| 11,923,494 B2 | 3/2024 | Erb et al. |
| 2001/0038939 A1 | 11/2001 | Bailey |
| 2002/0146620 A1 | 10/2002 | Connell |
| 2003/0027051 A1 | 2/2003 | Kejha et al. |
| 2003/0096170 A1 | 5/2003 | Fujiwara et al. |
| 2003/0194605 A1 | 10/2003 | Fauteux et al. |
| 2004/0001302 A1 | 1/2004 | Sato et al. |
| 2004/0161667 A1* | 8/2004 | Fukuzawa ......... H01M 10/0525 429/185 |
| 2005/0019643 A1 | 1/2005 | Sugita et al. |
| 2005/0106456 A1 | 5/2005 | Puester et al. |
| 2007/0210760 A1 | 9/2007 | Shimamura et al. |
| 2008/0187824 A1 | 8/2008 | Tomantschger |
| 2009/0023059 A1 | 1/2009 | Kinoshita et al. |
| 2009/0068531 A1 | 3/2009 | Sawa et al. |
| 2009/0087728 A1 | 4/2009 | Less et al. |
| 2009/0117456 A1* | 5/2009 | Hosaka ............. H01M 10/0418 429/152 |
| 2009/0136832 A1 | 5/2009 | Mitsuda et al. |
| 2009/0233175 A1* | 9/2009 | Kelley ................ H01M 50/571 429/235 |
| 2009/0297892 A1 | 12/2009 | Ijaz et al. |
| 2010/0124693 A1 | 5/2010 | Kosugi et al. |
| 2010/0134942 A1 | 6/2010 | Wang et al. |
| 2010/0285355 A1 | 11/2010 | Kozinsky et al. |
| 2011/0294007 A1 | 12/2011 | Hosaka et al. |
| 2012/0148913 A1 | 6/2012 | Chiba |
| 2012/0156552 A1 | 6/2012 | Miyazaki et al. |
| 2012/0189896 A1 | 7/2012 | Zhou et al. |
| 2012/0219835 A1 | 8/2012 | Kawabe et al. |
| 2012/0263995 A1 | 10/2012 | Naito et al. |
| 2013/0065106 A1 | 3/2013 | Faust |
| 2013/0089774 A1 | 4/2013 | Chami |
| 2013/0242593 A1 | 9/2013 | LoRocco et al. |
| 2013/0266823 A1 | 10/2013 | Lee |
| 2014/0127542 A1 | 5/2014 | Li et al. |
| 2014/0154542 A1 | 6/2014 | Issaev et al. |
| 2014/0178753 A1 | 6/2014 | Chu et al. |
| 2015/0037616 A1 | 2/2015 | Wyatt et al. |
| 2015/0155564 A1 | 6/2015 | Chami et al. |
| 2015/0200393 A1 | 7/2015 | Li et al. |
| 2015/0228937 A1 | 8/2015 | Spilker |
| 2015/0311490 A1 | 10/2015 | Murase et al. |
| 2015/0325894 A1 | 11/2015 | Merriman et al. |
| 2016/0049646 A1 | 2/2016 | Fujiki et al. |
| 2016/0049679 A1 | 2/2016 | Stevens et al. |
| 2016/0093845 A1 | 3/2016 | DeKeuster et al. |
| 2016/0099456 A1 | 4/2016 | Kwon et al. |
| 2016/0099490 A1 | 4/2016 | Larsson |
| 2016/0111729 A1 | 4/2016 | Kim et al. |
| 2016/0197352 A1 | 7/2016 | Blaser et al. |
| 2016/0248113 A1 | 8/2016 | He et al. |
| 2016/0329535 A1 | 11/2016 | Moomaw et al. |
| 2016/0329606 A1 | 11/2016 | Ro et al. |
| 2017/0012331 A1 | 1/2017 | Ng et al. |
| 2017/0077545 A1 | 3/2017 | Shaffer, II et al. |
| 2017/0133689 A1 | 5/2017 | Moore et al. |
| 2017/0214057 A1 | 7/2017 | Kotik et al. |
| 2018/0013144 A1 | 1/2018 | Li et al. |
| 2018/0219227 A1 | 8/2018 | Moomaw et al. |
| 2018/0226654 A1 | 8/2018 | Ohsawa et al. |
| 2018/0316063 A1 | 11/2018 | Masel et al. |
| 2019/0036147 A1 | 1/2019 | Yuan et al. |
| 2019/0237748 A1 | 8/2019 | Shin et al. |
| 2019/0283699 A1 | 9/2019 | Park |
| 2020/0028166 A1 | 1/2020 | Tanaka et al. |
| 2020/0052305 A1 | 2/2020 | Campbell et al. |
| 2020/0271371 A1 | 8/2020 | Oh et al. |
| 2020/0395594 A1 | 12/2020 | Doi et al. |
| 2021/0126311 A1 | 4/2021 | Jang et al. |
| 2022/0111758 A1 | 4/2022 | Ijaz et al. |
| 2022/0111759 A1 | 4/2022 | Ijaz |
| 2022/0115897 A1 | 4/2022 | Ijaz |
| 2023/0026549 A1 | 1/2023 | Ijaz et al. |

FOREIGN PATENT DOCUMENTS

| | | |
|---|---|---|
| CN | 101809801 A | 8/2010 |
| CN | 101884125 A | 11/2010 |
| CN | 102005566 A | 4/2011 |
| CN | 102187504 A | 9/2011 |
| CN | 102272977 A | 12/2011 |
| CN | 102341948 A | 2/2012 |
| CN | 102576850 A | 7/2012 |
| CN | 103069614 A | 4/2013 |
| CN | 103165920 A | 6/2013 |
| CN | 103222098 A | 7/2013 |
| CN | 103548196 A | 1/2014 |
| CN | 103855360 A | 6/2014 |
| CN | 103904294 A | 7/2014 |
| CN | 104466191 A | 3/2015 |
| CN | 104604003 A | 5/2015 |
| CN | 107851747 A | 3/2018 |
| EP | 1125336 A1 | 8/2001 |
| EP | 1156547 A1 | 11/2001 |
| EP | 2892097 A1 | 7/2015 |
| EP | 3196955 A1 | 7/2017 |
| EP | 3317907 A | 5/2018 |
| EP | 3435473 A1 | 1/2019 |
| JP | 0562683 A | 3/1993 |
| JP | 06503442 A | 4/1994 |
| JP | 07161346 A | 6/1995 |
| JP | 2001357854 A | 12/2001 |
| JP | 2002343452 A | 11/2002 |
| JP | 2003096219 A | 4/2003 |
| JP | 3522303 B2 | 4/2004 |
| JP | 2005005163 A | 1/2005 |
| JP | 2006012556 A | 1/2006 |
| JP | 2007012584 A | 1/2007 |
| JP | 2009224097 A | 10/2009 |
| JP | 2011009203 A | 1/2011 |
| JP | 2011071011 A | 4/2011 |
| JP | 4857710 B2 | 1/2012 |
| JP | 2012234823 A | 11/2012 |
| JP | 2013114746 A | 6/2013 |
| JP | 2013187074 A | 9/2013 |
| JP | 5410822 B2 | 2/2014 |
| JP | 2014029818 A | 2/2014 |
| JP | 2018083957 A | 5/2018 |
| JP | 2018519646 A | 7/2018 |
| JP | 6636607 | 12/2019 |
| KR | 20130066795 A | 6/2013 |
| WO | 8504287 A | 9/1985 |
| WO | 9210861 A1 | 6/1992 |
| WO | 2010111087 A1 | 9/2010 |
| WO | 2016031689 A1 | 3/2016 |
| WO | 2017007827 A1 | 1/2017 |

(56) References Cited

FOREIGN PATENT DOCUMENTS

| WO | 2018057566 | A1 | 3/2018 |
| WO | 2018195372 | A1 | 10/2018 |
| WO | 2018213601 | A2 | 11/2018 |
| WO | 2019059133 | A1 | 3/2019 |
| WO | 2019184311 | A1 | 10/2019 |
| WO | 2021048028 | A1 | 3/2021 |

OTHER PUBLICATIONS

U.S. Appl. No. 15/742,009, Non-Final Office Action, Mailed on Nov. 30, 2020, 13 pages.
U.S. Appl. No. 15/742,009, Non-Final Office Action, Mailed on Nov. 15, 2019, 14 pages.
U.S. Appl. No. 15/742,009, Non-Final Office Action, Mailed on Aug. 3, 2021, 16 pages.
U.S. Appl. No. 15/742,009, Notice of Allowance, Mailed on Dec. 24, 2021, 12 pages.
U.S. Appl. No. 15/962,133, Final Office Action, Mailed on Jul. 7, 2020, 5 pages.
U.S. Appl. No. 15/962,133, Non-Final Office Action, Mailed on Jan. 21, 2020, 10 pages.
U.S. Appl. No. 15/962,133, Notice of Allowance, Mailed on Feb. 9, 2021, 8 pages.
U.S. Appl. No. 16/007,534, Non-Final Office Action, Mailed on May 5, 2020, 11 pages.
U.S. Appl. No. 16/007,534, Notice of Allowance, Mailed on Nov. 18, 2020, 8 pages.
U.S. Appl. No. 16/038,865, Final Office Action, Mailed on Jun. 1, 2021, 7 pages.
U.S. Appl. No. 16/038,865, Non-Final Office Action, Mailed on Nov. 6, 2020, 13 pages.
U.S. Appl. No. 16/038,865, Notice of Allowance, Mailed on Aug. 13, 2021, 8 pages.
U.S. Appl. No. 16/049,250, Non-Final Office Action, Mailed on Apr. 8, 2020, 8 pages.
U.S. Appl. No. 16/049,250, Notice of Allowance, Mailed on Oct. 7, 2020, 7 pages.
U.S. Appl. No. 16/108,498, Final Office Action, Mailed on Dec. 9, 2020, 25 pages.
U.S. Appl. No. 16/108,498, Non-Final Office Action, Mailed on May 17, 2021, 21 pages.
U.S. Appl. No. 16/108,498, Non-Final Office Action, Mailed on Apr. 30, 2020, 9 pages.
U.S. Appl. No. 16/108,498, Notice of Allowance, Mailed on Feb. 24, 2022, 11 pages.
U.S. Appl. No. 16/108,503, Final Office Action, Mailed on Oct. 12, 2022, 8 pages.
U.S. Appl. No. 16/108,503, Final Office Action, Mailed on May 25, 2021, 9 pages.
U.S. Appl. No. 16/108,503, Non-Final Office Action, Mailed on Oct. 2, 2020, 11 pages.
U.S. Appl. No. 16/108,503, Non-Final Office Action, Mailed on Feb. 2, 2022, 9 pages.
U.S. Appl. No. 16/108,503, Notice of Allowance, Mailed on Feb. 10, 2023, 8 pages.
U.S. Appl. No. 16/108,522, Non-Final Office Action, Mailed on Sep. 9, 2020, 10 pages.
U.S. Appl. No. 16/108,522, Notice of Allowance, Mailed on Feb. 26, 2021, 8 pages.
U.S. Appl. No. 16/263,890, Non-Final Office Action, Mailed on Jun. 16, 2020, 9 pages.
U.S. Appl. No. 16/263,890, Notice of Allowance, Mailed on Oct. 23, 2020, 8 pages.
U.S. Appl. No. 16/273,625, Final Office Action, Mailed on Feb. 16, 2021, 14 pages.
U.S. Appl. No. 16/273,625, Non-Final Office Action, Mailed on May 4, 2020, 14 pages.
U.S. Appl. No. 16/273,625, Non-Final Office Action, Mailed on Dec. 24, 2021, 16 pages.
U.S. Appl. No. 16/273,625, Notice of Allowance, Mailed on Sep. 1, 2022, 12 pages.
U.S. Appl. No. 16/522,475, Non-Final Office Action, Mailed on May 17, 2021, 17 pages.
U.S. Appl. No. 16/613,094, Final Office Action, Mailed on Jan. 23, 2023, 15 pages.
U.S. Appl. No. 16/613,094, Non Final Office Action, Mailed on Aug. 19, 2022, 16 Pages.
U.S. Appl. No. 16/658,442, Final Office Action, Mailed on Aug. 16, 2022, 15 pages.
U.S. Appl. No. 16/658,442, Non-Final Office Action, Mailed on Feb. 22, 2022, 16 pages.
U.S. Appl. No. 16/683,088, Final Office Action, Mailed on Oct. 12, 2021, 12 pages.
U.S. Appl. No. 16/683,088, Non-Final Office Action, Mailed on Sep. 2, 2021, 10 pages.
U.S. Appl. No. 16/683,088, Notice of Allowance, Mailed on Nov. 22, 2021, 8 pages.
U.S. Appl. No. 16/683,091, Non-Final Office Action, Mailed on Aug. 18, 2021, 22 pages.
U.S. Appl. No. 17/014,550, Notice of Allowance, Mailed on Oct. 18, 2022, 10 pages.
U.S. Appl. No. 17/014,637, Final Office Action, Mailed on Dec. 1, 2022, 24 pages.
U.S. Appl. No. 17/014,637, Non-Final Office Action, Mailed on Feb. 24, 2022, 20 pages.
U.S. Appl. No. 17/014,637, Non-Final Office Action, Mailed on Jul. 25, 2022, 20 pages.
U.S. Appl. No. 17/014,717, Non-Final Office Action, Mailed on Oct. 13, 2022, 14 pages.
U.S. Appl. No. 17/014,717, Notice of Allowance, Mailed on Jan. 31, 2023, 7 pages.
U.S. Appl. No. 17/014,768, Non-Final Office Action, Mailed on Jun. 30, 2022, 10 pages.
U.S. Appl. No. 17/014,768, Notice of Allowance, Mailed on Nov. 4, 2022, 7 pages.
U.S. Appl. No. 17/353,059, Non-Final Office Action, Mailed on Nov. 1, 2022, 8 pages.
U.S. Appl. No. 17/353,059, Notice of Allowance, Mailed on Feb. 28, 2023, 8 pages.
Boeva et al., "Soluble and Highly Ionically Conducting Interpolyelectrolyte Complexes Prepared via Chemical Template Polymerization of Aniline in the Presence of Perfluorinated Polysulfonic Acid", The Royal Society of Chemistry, vol. 4, No. 100, Oct. 31, 2014, pp. 56677-56681.
China Patent Application No. 201680039891.9, Notice of Decision to Grant, Mailed on Mar. 22, 2021, 2 pages.
China Patent Application No. 201680039891.9, Office Action, Mailed on Jun. 10, 2020, 18 pages.
China Patent Application No. 201680039891.9, Office Action, Mailed on Jan. 6, 2020, 23 pages.
China Patent Application No. 201680039891.9, Office Action, Mailed on Oct. 27, 2020, 8 pages.
China Patent Application No. 201780053071.X, Office Action, Mailed on Mar. 18, 2022, 15 pages.
China Patent Application No. 201780053071.X, Office Action, Mailed on Nov. 2, 2021, 20 pages.
China Patent Application No. 201780053071.X, Office Action, Mailed on Apr. 16, 2021, 21 pages.
China Patent Application No. 201780053071.X, Office Action, Mailed on Aug. 30, 2022, 29 pages.
China Patent Application No. 201780053071.X, Office Action, Mailed on Apr. 27, 2023, 9 pages.
China Patent Application No. 201880026199.1, Office Action, Mailed on May 10, 2023, 10 pages.
China Patent Application No. 201880026199.1, Office Action, Mailed on Dec. 15, 2022, 13 pages.
China Patent Application No. 201880026199.1, Office Action, Mailed on Mar. 3, 2022, 8 pages.
China Patent Application No. 202011204662.2, Office Action, Mailed on Aug. 26, 2022, 14 pages.
China Patent Application No. 202011211648.5, Notice of Decision to Grant, Mailed on Mar. 6, 2023, 2 pages.

(56) References Cited

OTHER PUBLICATIONS

China Patent Application No. 202011211648.5 , Office Action, Mailed on Aug. 19, 2022, 12 pages.
European Patent Application No. 16738994.9 , Notice of Decision to Grant, Mailed on Sep. 24, 2020, 2 pages.
European Patent Application No. 16738994.9 , Office Action, Mailed on Mar. 23, 2018, 3 pages.
Japan Patent Application No. 2018-500449 , Notice of Decision to Grant, Mailed on Nov. 18, 2019, 2 pages.
Japan Patent Application No. 2018-500449 , Office Action, Mailed on Jan. 21, 2019, 11 pages.
Korea Patent Application No. 10-2018-7000263 , Notice of Decision to Grant, Mailed on Apr. 8, 2020, 2 pages.
Korea Patent Application No. 10-2018-7000263 , Office Action, Mailed on Sep. 27, 2019, 16 pages.
Korea Patent Application No. 10-2018-7000263 , Office Action, Mailed on Feb. 28, 2019, 5 pages.
International Patent Application No. PCT/US2016/041151 , International Preliminary Report on Patentability, Mailed on Jan. 18, 2018, 8 pages.
International Patent Application No. PCT/US2016/041151 , International Search Report and Written Opinion, Mailed on Aug. 25, 2016, 10 pages.
International Patent Application No. PCT/US2017/052413 , International Preliminary Report on Patentability, Mailed on Apr. 4, 2019, 12 pages.
International Patent Application No. PCT/US2017/052413 , International Search Report and Written Opinion, Mailed on Feb. 1, 2018, 19 pages.
International Patent Application No. PCT/US2017/052413 , "Invitation to Pay Additional Fees and, Where Applicable, Protest Fee", Dec. 8, 2017, 11 pages.
International Patent Application No. PCT/US2018/028472 , International Preliminary Report on Patentability, Mailed on Oct. 31, 2019, 10 pages.
International Patent Application No. PCT/US2018/028472 , International Search Report and Written Opinion, Mailed on Jul. 27, 2018, 13 pages.
International Patent Application No. PCT/US2018/033218 , International Preliminary Report on Patentability, Mailed on Nov. 28, 2019, 9 pages.
International Patent Application No. PCT/US2018/033218 , International Search Report and Written Opinion, Mailed on Nov. 16, 2018, 13 pages.
International Patent Application No. PCT/US2018/042598 , International Preliminary Report on Patentability, Mailed on Feb. 6, 2020, 10 pages.
International Patent Application No. PCT/US2018/042598 , International Search Report and Written Opinion, Mailed on Oct. 2, 2018, 14 pages.
International Patent Application No. PCT/US2020/060348 , International Preliminary Report on Patentability, Mailed on May 27, 2022, 8 pages.
International Patent Application No. PCT/US2020/060348 , International Search Report and Written Opinion, Mailed on Mar. 12, 2021, 9 pages.
International Patent Application No. PCT/US2020/060350 , International Preliminary Report on Patentability, Mailed on May 27, 2022, 8 pages.
International Patent Application No. PCT/US2020/060350 , International Search Report and Written Opinion, Mailed on Mar. 12, 2021, 12 pages.
International Patent Application No. PCT/US2021/049023 , International Preliminary Report on Patentability, Mailed on Mar. 23, 2023, 8 pages.
International Patent Application No. PCT/US2021/049023 , International Search Report and Written Opinion, Mailed on Dec. 22, 2021, 11 pages.
Thaler et al., "Automotive Battery Technology", In Beijing Institute of Technology Press, Feb. 28, 2017, 5 pages.
Thuc et al., "Study on Synthesis and Characterization of Anion Exchange Membrane Based on Poly (Vinyl Alcohol) Modified by Free-Radical Polymerization", International Journal of Electrochemical Science, vol. 15, Jul. 10, 2020, pp. 8190-8199.
Weng et al., "Three-Electrolyte Electrochemical Energy Storage Systems Using Both Anion- and Cation-Exchange Membranes as Separators", Energy, vol. 167, Jan. 15, 2019, pp. 1-32.
China Patent Application No. 201880026199.1, "Office Action", Apr. 30, 2024, 22 pages.
Machine Translation of JP 2001357854 A, Dec. 26, 2001, 18 pages.
U.S. Appl. No. 18/054,800, Non-Final Office Action, Jul. 5, 2024, 8 pages.
U.S. Appl. No. 18/108,551, Notice of Allowance, Aug. 12, 2024, 10 pages.

* cited by examiner

BATTERY WITH DISCONTINUOUS BOND LAYER

CROSS-REFERENCES TO RELATED APPLICATIONS

This application is a continuation of U.S. patent application Ser. No. 17/353,059, filed Jun. 21, 2021, which is a divisional of U.S. patent application Ser. No. 16/108,522, filed Aug. 22, 2018, which claims the benefit of U.S. Patent Application Ser. No. 62/564,560, filed Sep. 28, 2017, the entire contents of which are hereby incorporated by reference for all purposes.

TECHNICAL FIELD

The present technology relates to batteries and battery components. More specifically, the present technology relates to configurations of components for stacked batteries.

BACKGROUND

In batteries having multiple battery cells, bus bars may be used to provide accumulated current from the battery cells. Additionally, sensors may be used to monitor aspects of the batteries or the individual cells.

SUMMARY

The present technology relates to energy storage devices, including battery cells and batteries, which may include lithium-ion batteries having a variety of shapes including stacked cells, which may be or include bipolar batteries as well as batteries stacked in any orientation including vertical and horizontal, for example. These devices may include current collectors configured based on a z-direction transmission of current through the cell components, although current collectors configured based on an xy-directional transmission of current may also benefit from the present designs. The batteries and cells may include a host of features and material configurations as will be described throughout the disclosure.

Batteries according to embodiments of the present technology may include a first battery cell including a first body characterized by a first length and a first width, and a first tab extending from an edge of the first body. The first tab may be characterized by a width less than the first width of the first body. The batteries may also include a second battery cell stacked below the first battery cell. The second battery cell may include a second body characterized by a second length and a second width, and a second tab extending from an edge of the second body. The second tab may be characterized by a width less than the second width of the second body. The second tab may also be characterized by a width greater than the width of the first tab providing an extension of the second tab protruding from below the first tab.

In some embodiments, a first voltage sensor may be coupled with a surface of the first tab, and a second voltage sensor may be coupled with a surface of the extension of the second tab. The batteries may also include an insulating tape extending between the first tab and the second tab along the width of the second tab. The insulating tape may extend over the second voltage sensor, and the insulating tape may be characterized by a width greater than the width of the second tab. The first voltage sensor may be coupled with a current collector of the first battery cell. The current collector of the first battery cell may be a cathode current collector, and a conductive tape may couple the first voltage sensor with the cathode current collector. The batteries may also include a third battery cell stacked below the second battery cell. The third battery cell may include a third body characterized by a third length and a third width. The third battery cell may also include a third tab extending from an edge of the third body. The third tab may be characterized by a width less than the third width of the third body. The third tab may also be characterized by a width greater than the width of the second tab providing an extension of the third tab protruding from below the second tab. The first battery cell may be electrically coupled with the second battery cell, and when in operation, the first battery cell may be configured to receive current vertically from the second battery cell.

Embodiments of the present technology may also encompass stacked batteries. The stacked batteries may include a plurality of battery cells electrically coupled together. The stacked batteries may also include an end plate electrically coupled with the plurality of battery cells. The end plate may be configured to distribute current through the plurality of battery cells, and the end plate may include a plurality of conductive layers laminated together.

In some embodiments the plurality of conductive layers may be laminated discontinuously across the end plate. The stacked batteries may also include a joint electrically coupled with the end plate along an edge of the end plate. The joint may provide electrical mating for a power cable configured to provide current to or receive current from the stacked battery. The stacked batteries may also include a conductive bonding promoter applied along a surface of the end plate adjacent the plurality of battery cells. The plurality of conductive layers of the end plate may include a metal selected from the group consisting of aluminum, copper, and nickel. Each conductive layer of the plurality of conductive layers may be characterized by a thickness of between about 10 µm and about 100 µm. The stacked batteries may include an insulating material disposed along an edge region of a first surface of the end plate electrically coupled with the plurality of battery cells. The insulation material may also be disposed across a second surface of the end plate opposite the first surface of the end plate.

The end plate may be characterized by flexibility along a length of the end plate configured to maintain contact with the plurality of battery cells across a surface of the end plate during operational swelling of the plurality of battery cells. Each cell of the plurality of battery cells may include a tab extending from a body of the battery cell. Each tab may be characterized by a width greater than a width of an overlying tab providing an extension of each underlying tab protruding from below each overlying tab. The stacked batteries may also include a plurality of voltage sensors. The plurality of voltage sensors may be distributed to electrically couple a voltage sensor from the plurality of voltage sensors with an individual tab from the plurality of battery cells such that each battery cell of the plurality of battery cells includes a voltage sensor electrically coupled with the tab of the battery cell. Each voltage sensor may include a lead extending from the voltage sensor in a direction parallel to the width of the tab of the battery cell of the plurality of battery cells with which the voltage sensor is electrically coupled.

Additional stacked batteries are also encompassed by embodiments of the present technology. The stacked batteries may include a first end plate including a first plurality of conductive layers discontinuously laminated together. The stacked batteries may include a second end plate including a second plurality of conductive layers discontinuously laminated together. The stacked batteries may also include a plurality of battery cells electrically coupled together and stacked between the first end plate and the second end plate. In some embodiments, the plurality of battery cells may be electrically coupled together to transfer current, when in operation, between the first end plate and the second end plate through each cell of the plurality of battery cells individually in series.

Such technology may provide numerous benefits over conventional technology. For example, the bus bars may allow accommodation of non-planar surfaces of battery cells in operation. Additionally, tabbed configurations of the individual battery cells may facilitate incorporation of voltage sensors within stacked designs. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
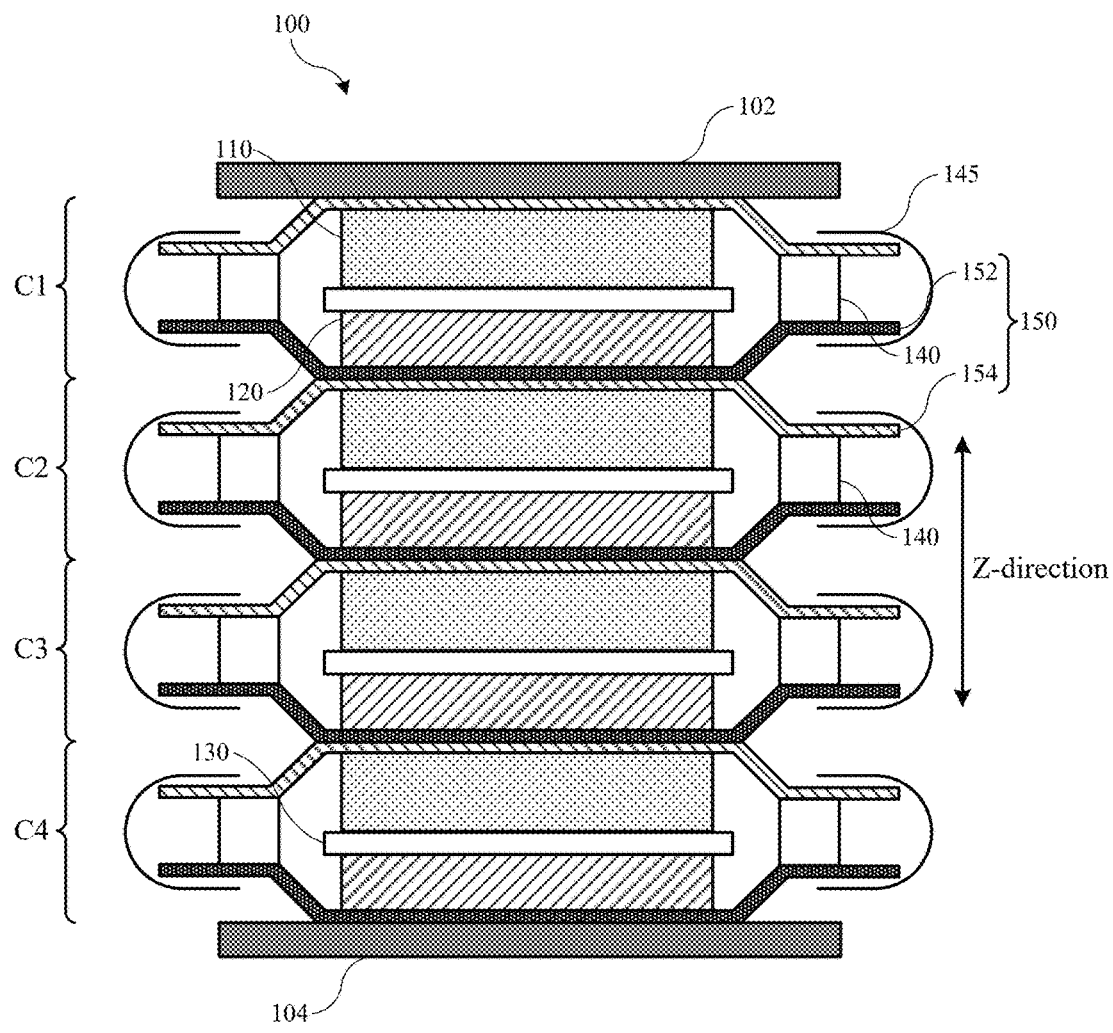
FIG. 1 shows a schematic cross-sectional view of an energy storage device according to some embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, and more generally energy storage devices, may include multiple battery cells coupled with one another in a series or a parallel electrical configuration. The cells may also be physically coupled with one another to form the battery. Batteries having cells in a stacked orientation and characterized by z-direction transmission of current through the cells may have current collectors of adjacent cells in physical contact with one another. The proximity of cells in relation to one another may produce tight configurations limiting sensors or other associated materials for the battery. For example, when multiple cells are incorporated within a single battery, variation between the cells may affect charging and discharging of the cells. Without individual monitoring of the cells, overcharge or overdraw on any cell may impact the battery and cause fault or failure of the battery.

Additionally, many batteries and battery cells may swell or otherwise flex during operation. This swelling may cause a non-planar profile to form across surfaces of the cell or group of cells. Bus bars used to transfer current to and from the battery or battery cells may be sized based on the amount of current or voltage associated with the battery. Generally speaking, the more current or voltage, the more robust the bus bars. As bus bars increase in thickness, they tend to become more rigid. When coupled with a battery having a planar surface, complete contact may be formed between the components. However, if the battery or cells flex or swell during operation, a rigid, planar profile of a bus bar may no longer accommodate the non-planar profile of the battery. This may cause delamination or hot spots in some cases, and may affect battery capability, charging, and lifecycle.

The present technology may overcome many of these issues by using materials and configurations that allow specific access to individual cells, and accommodate the operational swelling of battery cells. By producing individual battery cells having extended tab portions of different sizes, voltage sensors may be electrically and physically coupled with each individual cell in a space-effective manner. Additionally, bus bars according to some embodiments of the present technology may have discontinuous lamination, which may allow the bus bar to flex along dimensions of the bus bar to accommodate movement or irregularities across a battery or battery cell.

Although the remaining portions of the description will routinely reference lithium-ion batteries, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 depicts a schematic cross-sectional view of an energy storage device according to embodiments of the present technology. The energy storage devices may include a single current collector or coupled current collectors. The energy storage devices may operate in a conventional manner with regard to electronic flow across or through material layers, such as providing electronic mobility across an xy-plane of the current collectors. Additionally, the described devices may operate by electronic flow through the structure in a z-direction through individual cells as opposed to via tabbed current collectors as described above for conventional batteries.

As illustrated, the stacked battery 100 may include a stack of electrochemical cells C1, C2, C3, and C4 between end plates 102 and 104. End plates 102 and 104 may be metal current collector plates, which can serve both electrical and mechanical functions. In some embodiments, end plates 102 and 104 can be support plates that form part of an external housing of the stacked battery. End plates 102 and 104 may also provide mechanical support within a housing of the stacked battery. Some or all of the support plates may be electrically conductive, and there may be a terminal within the support plate that is electrically connected to the end plate. In embodiments an additional plate similar to end plates 102 and 104 may be disposed within the stack of cells, such as between two cells. This configuration including an additional plate may provide structural rigidity, and the additional plate may also preform electronic functions similar to end plates 102, 104. End plates 102 and 104 may act as positive and negative terminals of the battery. The cells may pass current in the z-direction through individual cells to the end plates, which may transfer current in any direction across the plate and from the battery.

The stack of electrochemical cells may include any number of electrochemical cells depending on the selected voltage for the stacked battery 100, along with the individual voltage of each individual electrochemical cell. The cell stack may be arranged with as many or as few electrochemical cells in series as desired, as well as with intervening plates for support and current transfer. The cells C may be positioned adjacent, e.g. abutting, one another in some configurations. Each electrochemical cell C may include a cathode 110 and an anode 120, where the cathode 110 and anode 120 may be separated by separator 130 between the cathode and anode. Between the anode 120 of cell C1 and the cathode of adjacent cell C2 may be a stacked current collector 150. The stacked current collector 150 may form part of C1 and C2. On one side, stacked current collector 150 may be connected to the seal 140 of C1 and connected on an opposing side to the seal 140 of C2.

In some embodiments, as shown in FIG. 1, stacked current collector 150 may include a first current collector 152 and a second current collector 154. In embodiments one or both of the current collectors may include a metal or a non-metal material, such as a polymer or composite. As shown in the figure, in some embodiments the first current collector 152 and second current collector 154 can be different materials. In some embodiments, the first current collector 152 may be a material selected based on the potential of the anode 120, such as copper or any other suitable metal, as well as a non-metal material including a polymer. The second current collector may be a material selected based on the potential of the cathode 110, such as aluminum or other suitable metals, as well as a non-metal material including a polymer. In other words, the materials for the first and second current collectors can be selected based on electrochemical compatibility with the anode and cathode active materials used.

The first and second current collectors can be made of any material known in the art. For example, copper, aluminum, or stainless steel may be used, as well as composite materials having metallic aspects, and non-metallic materials including polymers. In some instances the metals or non-metals used in the first and second current collector can be the same or different. The materials selected for the anode and cathode active materials can be any suitable battery materials.

For example, the anode material can be silicon, graphite, carbon, a tin alloy, lithium metal, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors may have any suitable thickness, and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 2:
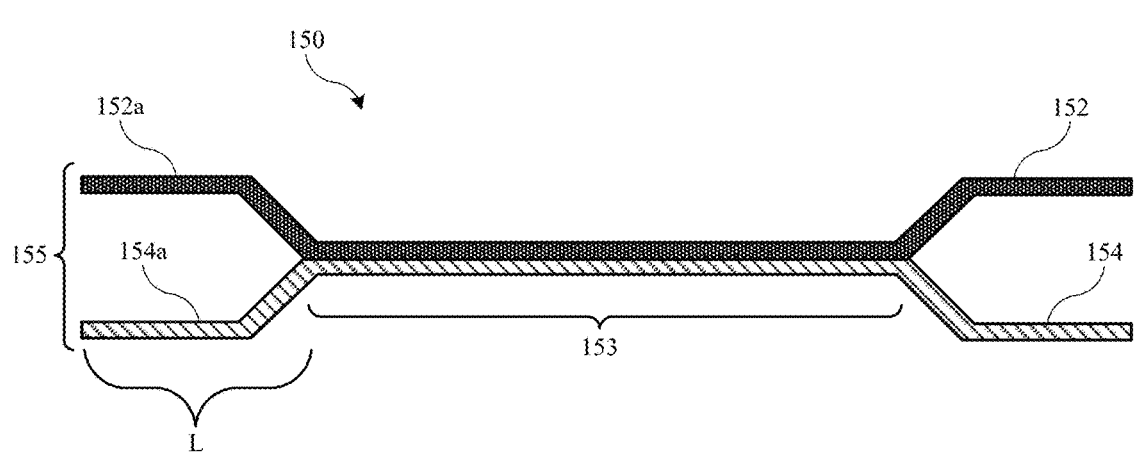
FIG. 2 shows a schematic cross-sectional view of a current collector according to some embodiments of the present technology.

Turning to FIG. 2, the stacked current collector 150 may have a connection region 153 where the first current collector 152 and second current collector 154 may be connected, and a gap region 155 at the peripheral ends of the collector 150. In the connection region 153, the first current collector and second current collector may be in direct contact or otherwise joined to be electrically-conductive. In some embodiments, the first current collector and second current collector may be directly connected, while in other embodiments the first current collector and second current collector may be indirectly connected via a conductive or adhesive material. To form the connection region 153, the first current collector 152 and the second current collector 154 may be laminated together. Additionally, the connection region 153 may be created by welding the first current collector 152 and the second current collector 154 together. The connection region 153 may also be created by using an adhesive, which may be electrically conductive, between the first current collector 152 and the second current collector 154. In other embodiments, the connection region 153 may be created by the wetting that can occur between the materials of the first current collector 152 and the second current collector 154.

In the gap region 155, the peripheral ends of the first current collector 152 and the second current collector 154 may be spaced apart and moveable relative to each other. As such, there may be a separation distance between the first and second current collectors, which may increase as the electrochemical cell swells. In some embodiments, the spaced apart peripheral ends of the first current collector 152 and the second current collector 154 may be of a length that is sufficient to accommodate an anticipated expansion of the individual electrochemical cells of the stacked battery during cycling of the battery. The peripheral ends of the current collectors 152a and 154a may have a length L, as shown in FIG. 2, which may be long enough that up to or at least about 10% expansion in the z-direction can be accommodated.

As shown in FIG. 1, each cell C1, C2, C3, and C4, also includes a seal 140, which, with the current collector layers, may electrochemically isolate the electrochemical cells from each other. Thus, each cathode-anode pair may be electrochemically sealed and isolated from neighboring electrochemical cells. Because the current collectors 152 and 154 may be separated at the peripheral ends, separate seals 140 can be formed on opposing sides, such as a top and bottom, of the stacked current collector 150. The seals 140 may be the same or different materials, and each seal 140 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically-insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 110, the anode 120, and the separator 130 may be preassembled. A first current collector 152 may then be connected to the anode while a second current collector 154 may be connected to the cathode to create a cell. The seal material may be disposed between the first current collector 152 and the second current collector 154 to form seals 140. Finally, the peripheral ends of the sealed electrochemical cell may be further taped to frame the cell. Tapes 145, as well as other coatings, sealing, or material layers, may be disposed around the outer perimeter of the metal layers and seals. The tape 145 may be substituted with ceramic or polymeric materials. Tape 145 may be included for various reasons including to prevent shorting to adjacent layers or to surrounding conductive surfaces within the device, to provide improved electrochemical or chemical stability, and to provide mechanical strength.

FIGS. 1 and 2 illustrate an exemplary stacked battery design according to the present technology. Additional configurations other than illustrated, or as variations on the designs, are also encompassed by the present technology. For example, certain embodiments may not include an additional seal material, and first current collector 152 and second current collector 154 may be directly coupled or bonded together. Additionally, the current collectors may include designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1 \times 10^{-4}$ ohm-m in embodiments. Additionally, exemplary current collectors may have an in-plane and through-plane resistivity of between about $1 \times 10^{-3}$ ohm-m and about 1,000 ohm-m. In other embodiments, more conventional electrical distribution may be employed, where current is transferred along conductive current collectors into and out of the cell.

Figure 3:
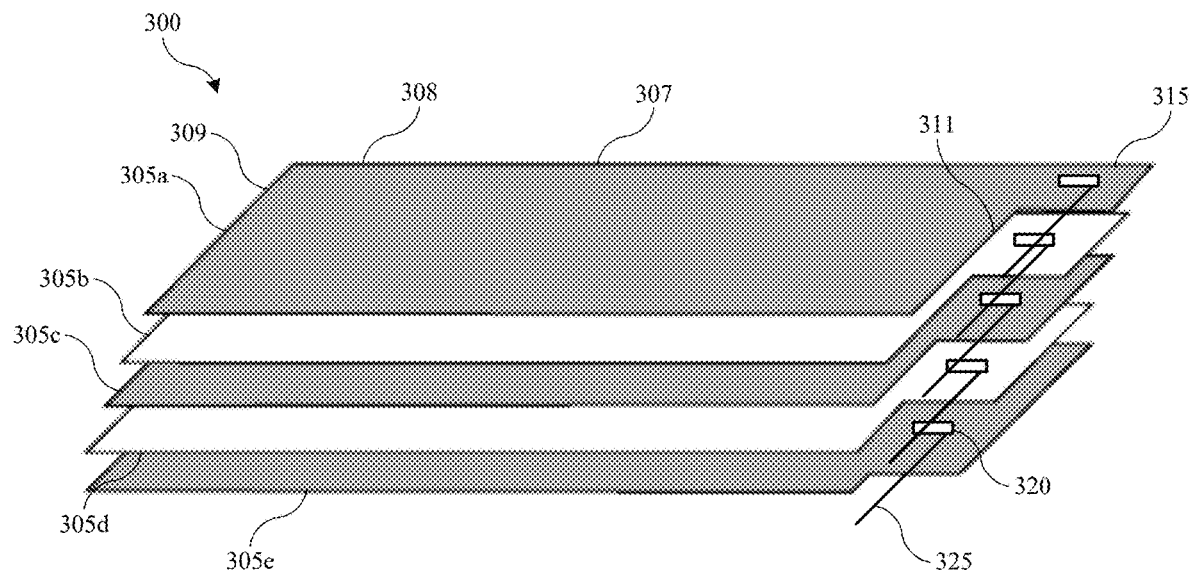
FIG. 3 shows a schematic exploded perspective view of a portion of an energy storage device according to some embodiments of the present technology.

Turning to FIG. 3 is shown a schematic perspective exploded view of a portion of an energy storage device 300 according to embodiments of the present technology. As illustrated, energy storage device 300 may include a plurality of battery cells 305. Five battery cells 305a-305e are shown for illustrative purposes, although it is to be understood that energy storage device 300 may include any number of battery cells similar to those discussed above with regard to FIGS. 1 and 2, and may include tens or hundreds of cells in various embodiments of the present technology. Each battery cell 305 may include any or all of the components discussed above, and may include a cathode active material and anode active material separated by a separator and incorporated between two current collectors. For example, battery cells 305 may include a view from the direction of each cathode current collector, for example, depending on the orientation of the energy storage device 300. Energy storage device 300 is illustrated without end plates, such as end plates 102, 104 previously described, in order to illustrate exemplary cell formations, although it is to be understood that in operation, battery cells 305 may be stacked between two or more end plates as described elsewhere in this disclosure.

Each battery cell 305 may be characterized by a shape that may be rectilinear, curved, or otherwise shaped to accommodate a device in which the battery cell may be disposed. Battery cells 305 may include a body portion 307, which may be characterized by a length and a width, or a diameter or diameters that extend between any two edge locations of body portion 307. As illustrated body portion 307 may be characterized by a length extending along edge 308, and a width extending along edge 309, for example. The lengths and widths may be any dimensions, and may be characterized by lateral dimensions less than or about 1 cm. In other embodiments battery cells according to the present technology are characterized by lengths or widths greater than 1 cm, and may be characterized by lateral dimensions greater than or about 10 cm, greater than or about 50 cm, greater than or about 1 m, or more. Although illustrated with a length greater than a width of each cell, it is to be understood that depending on the configuration, the width may be greater than the length. Each battery cell 305 may be characterized by a body portion having similar or identical length and width dimensions with each other battery cell 305 of the stack, while in other embodiments the battery cells 305 may be characterized by dimensions different than other cells within the stack of battery cells.

Each battery cell may also include a tab portion 315 extending from an edge 311 of each cell, which may be an edge characterized by the width of the battery cell 305. Although described as a separate component of the battery cell 305, tab portion 315 may be an extension of body portion 307. For example, body portion 307 may be a portion of the battery cell 305 where active materials are included between the current collectors, and may be characterized as an active region of the battery cell. Tab portion 315 may or may not include active materials, and may be an extension of just one current collector in some embodiments. As illustrated, however, each cell is produced or cut to include all materials across both the body portion 307 of each battery cell 305, as well as each tab portion 315.

As noted above, body portion 307 of each battery cell 305 may be characterized by similar or identical lengths and widths to provide consistent edges. Tab portions 315 may be characterized by similar lengths as they extend along edge 308 of each battery cell 305, although tab portions 315 may be characterized by different widths along edge 311 of each battery cell 315. In some embodiments, tab portion 315 of each underlying battery cell 305 may be characterized by an increasing width along edge 311. Each tab portion 315 may be characterized by a width less than the width of the associated battery cell 305, although in some embodiments, a bottom-most cell within a stack of battery cells 305, or end-most in a horizontal stack or stack of a different orientation than vertical, may be characterized by a width similar or equal to the width of the associated battery cell 305. For example, if an additional battery cell 305 were included below battery cell 305e, the additional battery cell may be characterized by a width equal to the width of battery cell 305e. Tab portions 315 may be formed from end portions of current collectors 152, 154 previously described. Accordingly, seal 140 may be formed to accommodate edge 311 as well as a portion of tab portion 315. However, seal 140 may not fully cover tab portion 315 to maintain access for voltage sensing. Accordingly, additional insulative materials may be included within the battery structure tab portions as will be described in more detail below.

By including tab portions of each battery cell characterized by increasing widths of each underlying battery cell, an exposed portion of each underlying battery cell may be produced. The exposed portions of each battery cell 305 may provide a step pattern down through the battery cells affording access to each individual cell of the group. Accordingly, a voltage sensor 320 may be coupled with each battery cell 305 of the stacked battery or energy storage device 300. The voltage sensors 320 may each include a lead 325 extending from the voltage sensor, which may extend from the voltage sensor 320 in any direction including along the length direction of each battery cell, or along the width direction of each battery cell 305 as illustrated. By incorporating a voltage sensor with each battery cell of the stack, individual battery monitoring can be performed, which may allow control systems to reduce or limit overcharge or overdraw of cells, which may increase life of the energy storage device 300.

Figure 4:
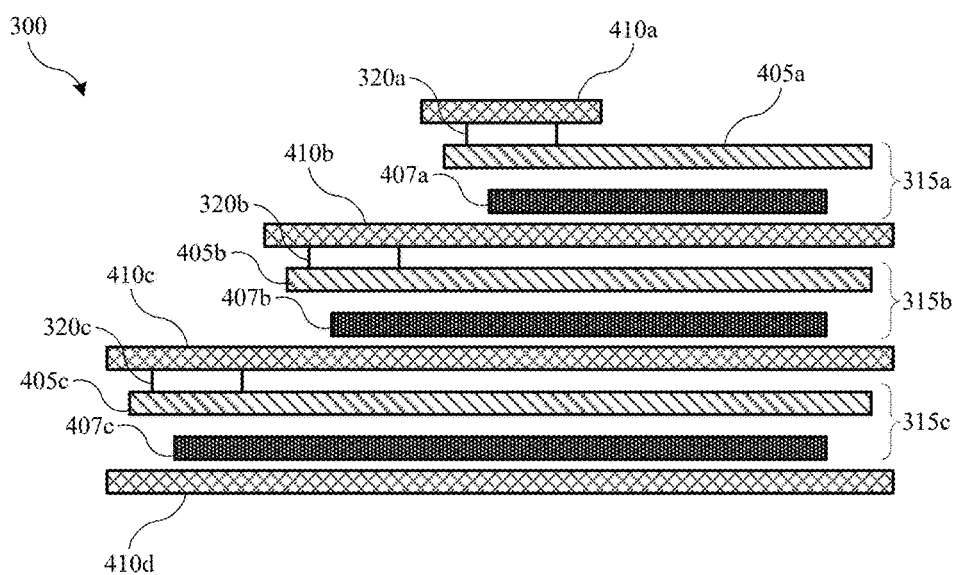
FIG. 4 shows a schematic elevational view of a portion of an energy storage device according to some embodiments of the present technology.

FIG. 4 shows a schematic elevational view of a portion of energy storage device 300 according to some embodiments of the present technology. FIG. 4 may illustrate an elevational end view of tab portions 315 of battery cells 305a, 305b, and 305c as discussed above. Again, FIG. 4 may not include all components within each battery cell, although it is to be understood that each battery cell 305 may include any or all of the components or configurations discussed throughout this disclosure. FIG. 4 illustrates additional features of the individual cells as well as exemplary materials that may be included to couple the cells and sensors together to limit contact between materials that may cause a short between battery cells.

Tab portion 315a of battery cell 305a illustrated in FIG. 3, may include a cathode current collector 405a as well as an anode current collector 407a. Although not illustrated to maintain simplicity, between the current collectors may be active materials and a separator as previously described. Similarly, tab portion 315b of battery cell 305b may include cathode current collector 405b and anode current collector 407b, and tab portion 315c of battery cell 305c may include cathode current collector 405c and anode current collector 407c. The cathode current collector 405 may extend beyond the linear dimensions of the anode current collector 407, which may facilitate limiting end portions of adjacent cells to short between insulative components. Accordingly, this overhang may extend on all sides of the cathode current collectors 405.

As shown in the figure, tab portion 315a may be characterized by a first width, which in this elevational view, may be considered a measurement laterally across the figure. As discussed, the first width may be less than the width of the body portion of battery cell 305a as previously described. Tab portion 315b may be characterized by a second width that may also be less than the width of battery cell 305b. Additionally, tab portion 315b may be characterized by a width greater than the first width of tab portion 315a. This additional width may provide an extension of tab portion 315b that protrudes from below tab portion 315a. Additionally, tab portion 315c of battery cell 305c may also be characterized by a width less than the width of battery cell 305c. However, the width of tab portion 315c may be greater than the width of second tab 315b, which may provide an extension of the tab portion 315c protruding from below tab portion 315b. As would be readily understood, additional battery cells may similarly include increased width tab portions compared to overlying cells to provide extensions of each cell through a stack of battery cells, which may include any number of cells.

Voltage sensor 320a may be coupled with a surface of tab portion 315a, and as illustrated is electrically coupled with cathode current collector 405a. Voltage sensor 320b may be coupled with a surface of tab portion 315b, and as illustrated is electrically coupled with cathode current collector 405b. Voltage sensor 320b may be coupled with the extension region of tab portion 315b, where battery cell 305b may be exposed from battery cell 305a. As noted above, each battery cell 305 may have similar or identical dimensions except for the extension region of the tab portion, where each underlying cell may have a tab portion characterized by a width larger than an adjacent overlying cell. Accordingly, in some embodiments this may provide the only location of access to underlying cells, where individual voltage sensors may be connected.

Additionally, the extension region of each tab portion may include no overlying material, and thus the height of the voltage sensor 320 may be accommodated without increasing the overall height of the structure. This may be except for a top-most voltage sensor extending above a top current collector, such as current collector 405a. Voltage sensors 320 may be coupled with the current collector in a number of ways including with a conductive adhesive or tape. For example, a copper or other conductive tape may be used to secure the voltage sensor to the current collector 405.

Although the cathode current collector may not be copper, there may not be concern for corrosion. Because the voltage sensor may be coupled on an exterior surface of the cathode current collector, such as on a surface opposite a surface on which active material may be disposed, electrolyte may not contact the voltage sensors 320.

As previously noted, seal 140 may not extend fully about the tab portions, and thus exposed regions of current collectors 405, 407 may be included in the tab portions 315, such as an underside of each tab portion. Accordingly, an insulating tape 410, which may be a polymer-containing tape such as polyethylene, or some other insulating material, such as a pottant or encapsulant, may be disposed along each current collector and voltage sensor in some embodiments to limit or prevent shorting capability between adjacent cells. For example, insulating tape 410a may extend over voltage sensor 320a as illustrated, and may also extend across current collector 405a. Insulating tape 410b may extend between tab portion 315a and tab portion 315b. Insulating tape 410b may be characterized by a width at least the same as current collector 405b, and may be characterized by a width greater than the width of tab portion 315b. For example, insulating tape 410b may include an overhang on both ends of tab portion 315b, such as overhanging beyond edge 308 of the battery cell 305b, as well as beyond an end of the extension region of the tab portion 315b, which may be an edge opposite 308.

As illustrated, insulating tape 410b may extend across and over voltage sensor 320b. Because voltage sensor 320b is electrically coupled with the tab portion 315b of battery cell 305b, if left unprotected, voltage sensor 320b may have a path for electrical short to anode current collector 407a. Accordingly, insulating tape 410b may extend past voltage sensor 320b and past current collector 405b to fully insulate the tab portion 315b against portions of tab portions 315a. Insulating tape 410 may be characterized by a length less than, up to, or about the same length as the tab portions 315. Insulating tape 410 may not extend into body portion 307 of the battery cells, which may be or include connection region 153, where an anode current collector of one cell is the same as or coupled with a cathode current collector of the next cell. With this connection scheme where the current collectors within the body portion may be coupled, a battery system may be produced with z-direction transmission of current. For example, when in operation, battery cell 305a may be electrically coupled with battery cell 305b to receive current vertically from battery cell 305b through the coupled current collectors as previously described.

Insulating tape 410c may be similar to insulating tape 410b, although insulating tape 410c may be characterized by a greater width based on the width of tab portion 315c, which may be longer than tab portion 315b. Insulating tape 410c may also extend over voltage sensor 320c as discussed with regard to the previous battery cell 305b. Insulating tape 410d may be included below a bottom battery cell within the battery cell stack. For example, if battery cell 305c were the last cell in a stack of cells, insulating tape 410d may be extended from beyond edge 308 underneath battery cell 305c, beyond an edge of tab portion 315c, and may be connected to insulating tape 410c to fully insulate the tab portion 315c. FIG. 4 is included to show exemplary layers of a battery cell stack, although in actual embodiments, the layers may not be separated as shown. For example, after application, insulating tape 410a, may be adhered to insulating tape 410b, which may be adhered to insulating tape 410c in order to further insulate the individual battery cells.

Voltage sensor leads 325 may extend through the coupling of insulating tape to be connected to controllers or other monitoring devices.

Figure 5:
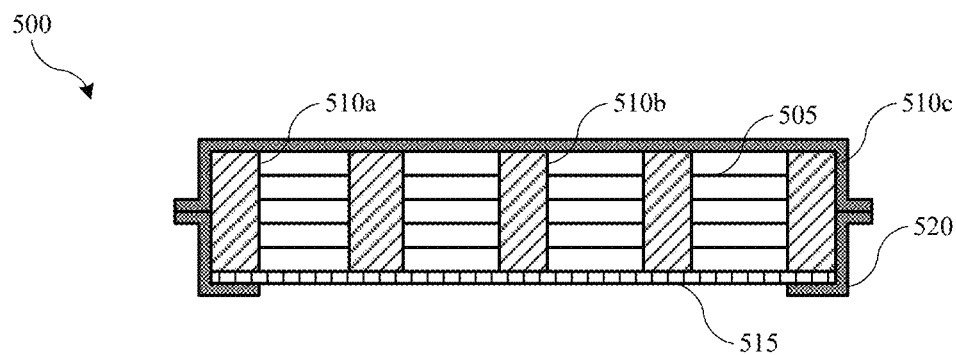
FIG. 5 shows a schematic cross-sectional view of an end plate of an energy storage device according to some embodiments of the present technology.

FIG. 5 shows a schematic cross-sectional view of an end plate 500 of an energy storage device according to some embodiments of the present technology. For example, end plate 500 may be an example of one or both of end plates 102, 104 previously described. End plate 500 may be included in a stacked battery or other battery structure, and may operate as a bus bar for a plurality of battery cells that may be connected between two end plates as previously discussed. End plate 500 may distribute current to and receive current from one or more battery cells included between end plate 500 and a second end plate, which may be a second end plate 500. In some embodiments, the current distribution may be a vertical or z-direction transmission, which may extend through each battery cell individually in series of a stack of battery cells. Because battery cells according to the present technology may swell, as previously discussed, end plate 500 may include multiple layers of material laminated together in some way, which may provide flexibility during operation.

As previously discussed, bus bars may be sized based on the operational capacity of the associated battery cell or cells. As bus bars are increasingly scaled, they may become more rigid due to the increased material used. For example, bus bars may include conductive materials, such as copper, aluminum, nickel, or any other material that may efficiently provide current to and from a battery cell. Battery cells according to some embodiments of the present technology may swell or flex during operation. Although the cells may be formed with planar surfaces, these surfaces may become textured or non-planar during operation due to swelling. A rigid bus bar or end plate may cause stress between the end plate and the associated battery cell. Over time, this may reduce the bonding between the components, and may delaminate the end plate from the battery cell, or break or tear the battery cell depending on the strength of the adhesion and the amount of deformation due to swelling. End plates according to embodiments of the present technology may overcome these issues by producing end plates that may be characterized by flexibility to accommodate cell swelling or other movement.

End plate 500 may include a plurality of conductive layers 505 stacked together. The number of layers may be based on operational requirements of the system or battery cells with which the end plate 500 may be electrically connected. Consequently, in various embodiments, end plate 500 may include two or more conductive layers 505, and may include at least about 3 layers, at least about 4 layers, at least about 5 layers, at least about 7 layers, at least about 10 layers, at least about 12 layers, at least about 15 layers, at least about 17 layers, at least about 20 layers, at least about 25 layers, at least about 30 layers, or more conductive layers 505. The layers may be laminated together to ensure the individual layers do not separate or move. The lamination may be discontinuous across the end plate. If the layers are completely laminated across the end plate 500, the result may be similar to having a single block of conductive material, which may become rigid and incapable of accommodating an amount of swelling of coupled battery cells. Thus, in embodiments, the lamination may occur discontinuously through the end plate 500.

End plate 500 may include a number of lamination positions 510 where the individual layers are coupled or bonded together. For example, the lamination may occur by including a conductive adhesive at locations between the layers, or the conductive layers 505 may be spot welded or otherwise bonded in certain locations, such as at lamination positions 510. Such discontinuous lamination may provide mechanical and electrical coupling of the individual conductive layers 505, while maintaining an amount of flexibility of the end plate. For example, lamination positions 510a and 510c may be at or proximate opposite ends of the end plate 500. Additionally, lamination position 510b may be at or proximate a midpoint of end plate 500. End plates according to the present technology may be capable of accommodating a variety of flexing across the end plate in any lateral direction.

For example, end plate 500 may be capable of maintaining substantial or complete coupling with a battery cell or stack during swelling that may create a height discrepancy between end lamination positions 510a, 510c and midpoint lamination position 510b of at least about 1% the thickness of the end plate 500. In some embodiments, the height discrepancy accommodated by end plate 500 may be at least about 5% the thickness of the end plate 500, at least about 10% the thickness, at least about 20% the thickness, at least about 30% the thickness, at least about 40% the thickness, at least about 50% the thickness, at least about 60% the thickness, at least about 70% the thickness, at least about 80% the thickness, at least about 90% the thickness, at least about 100% the thickness, or more. Accordingly, end plate 500 may accommodate a curvature across the end plate that may increase a height from a lowest point along a surface of the end plate to a highest point along a surface of the end plate that is up to or more than the planar thickness of the end plate 500.

End plate 500 may include a conductive bonding promoter 515 applied along a surface of end plate 500 that may be in contact with a battery cell, including an end battery cell of a battery stack. Conductive bonding promoter 515 may be a conductive adhesive in some embodiments that couples end plate 500 with a current collector of a battery cell adjacent the end plate. For example, in a stacked arrangement, one end plate 500 may be coupled with a cathode current collector of a battery cell at one end of a stack of battery cells, and a second end plate 500 may be coupled with a cathode current collector of a battery cell at an opposite end of the stack of battery cells. The conductive bonding promoter 515 may be the same or different between the two end plates 500, which may depend on the material of the associated current collectors.

For example, a cathode current collector may be aluminum, and an anode current collector may be copper. The conductive bonding promoter 515 may be adjusted to provide sufficient adherence to each of these materials. Similarly, where the current collectors may be or include similar materials, the conductive bonding promoter 515 may be the same as well. Any number of adjustments may be made to provide adequate coupling or bonding between end plates and current collectors described throughout the present technology, as would be readily appreciated as being similarly encompassed by the present technology. The conductive bonding promoter 515 may include a number of components including a binder, a resin, adhesive materials, and a conductive filler, such as a carbon or metallic powder incorporated within the conductive bonding promoter.

Each conductive layer 505 may be characterized by a thickness less than or about 500 µm in embodiments to allow for an amount of flexibility of the material. Additionally, exemplary conductive layers may be characterized by a thickness of less than or about 400 µm, less than or about 350 µm, less than or about 300 µm, less than or about 250 µm, less than or about 200 µm, less than or about 150 µm, less than or about 100 µm, less than or about 90 µm, less than or about 80 µm, less than or about 70 µm, less than or about 60 µm, less than or about 50 µm, less than or about 40 µm, less than or about 30 µm, less than or about 20 µm, less than or about 10 µm, less than or about 5 µm, or less. The layers may be characterized by thicknesses within any smaller range of these ranges, such as between about 10 µm and about 100 µm, or any other smaller range encompassed by any of these ranges.

The conductive layers 505 may be multiple materials, and each layer may be the same or a different material than adjacent layers to provide flexibility or rigidity to provide a tuned or tunable amount of flexibility. Any of the conductive layers 505 may be or include copper, aluminum, nickel, alloyed or plated materials, such as nickel-plated copper, or any conductive materials that may provide a pre-determined amount of flexibility of the end plate during operation.

End plate 500 may also include an insulation material 520 at least partially extending about the conductive layers 505. The insulation material 520 may include one piece of material, two pieces of material as illustrated, or more pieces depending on the coverage sought and the effect on fabrication. The insulation material 520 may be disposed along an edge region of a first surface of end plate 500, such as the surface on which the conductive bonding promoter is applied, and to which the end plate 500 may be electrically coupled with one or more battery cells. Such a covering as illustrated may ensure adequate electrical contact across the surface of the end plate and the associated battery cell or cells, while limiting any additional conductive surfaces, which may be at operational voltages, and could potentially short to other materials or components within a device. Insulation material 520 may be disposed and extend fully across a second surface of end plate 500 opposite the first surface. In this way, the end plate 500 may be fully insulated except for a window through which the end plate may be coupled with one or more battery cells, or a battery cell stack.

Figure 6A:
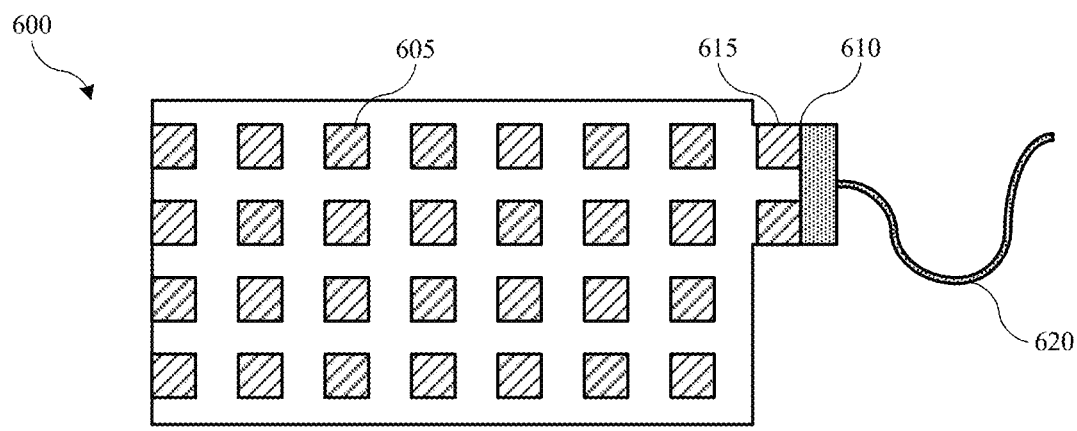
FIGS. 6A-6B show schematic plan views of exemplary end plates according to some embodiments of the present technology.
Figure 6B:
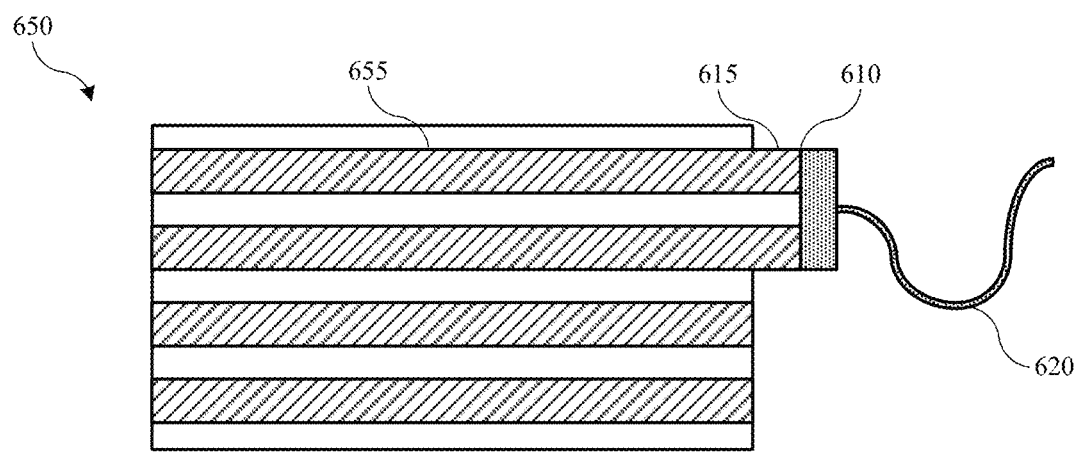

FIGS. 6A-6B show schematic plan views of exemplary end plates according to some embodiments of the present technology, and illustrate exemplary lamination types. FIG. 6A shows an end plate 600 that may be a view of the end plate without insulation material to illustrate lamination of the cell. End plate 600, however, may include any or all of the components of end plate 500 described above, or end plates 102, 104 previously discussed. End plate 600 may extend across a battery cell or a stack of battery cells, including battery cells that may or may not include tab portions as previously discussed. Where tab portions are formed, voltage monitors may be coupled with the tab portions as previously described to provide cell monitoring. Other cell monitoring schemes may be utilized in other embodiments in which tabs are not formed.

End plate 600 may include a joint 610 electrically coupled with the end plate 600. Joint 610 may be coupled with a tab 615 extending from an edge of end plate 600, or may be formed directly along an edge of end plate 600. The joint 610 may provide electrical mating for a power cable 620 configured to provide current to a battery cell or stack through end plate 600, or may receive current from a battery cell or stack through end plate 600. The illustrated lamination includes multiple spot laminations 605 distributed across the end plate 600. By including a discontinuous lamination pattern, end plate 600 may be capable of flexing in any number of directions to accommodate swelling or other translational movement from associated battery cells.

FIG. 6B illustrates an additional lamination pattern for exemplary end plate 650. End plate 650 may include similar components as end plate 600, or any of the other end plates discussed throughout the present disclosures. End plate 650 also shows joint 610 included with tab 615 to provide mating for power cable 620. End plate 650 illustrates an additional lamination pattern in which rows 655 of lamination have been formed across a length of end plate 650, although similar rows may additionally or alternatively be included along a width of end plate 650. FIGS. 6A and 6B are included merely to illustrate possible lamination patterns that may provide discontinuous lamination across an end plate to allow flexibility of the end plate to accommodate swelling or other movement of battery cells with which the end plates are coupled. It is to be understood that any other pattern of lamination may be provided that similarly affords flexibility of the end plate.

The present technology includes battery systems and energy storage devices that may include either or both of bus bars or tabbed cell structures to improve stacked batteries. By providing a tabbed structure improved access for individual cell monitoring may be available while limiting an effect on cell height to accommodate voltage sensors and other hardware. Additionally, bus bars including multiple conductive layers with a discontinuous lamination may allow flexibility to accommodate cell swelling, without risking delamination of the bus bar and associated battery cells.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery, comprising:
a first electrically conductive layer; and
a second electrically conductive layer adhered and electrically coupled to the first electrically conductive layer via a plurality of discontinuous adhesive regions extending through the first electrically conductive layer.

2. The battery of claim 1, wherein the plurality of discontinuous adhesive regions is distributed across the second electrically conductive layer.

3. The battery of claim 1, wherein the plurality of discontinuous adhesive regions includes a plurality of isolated adhesive regions distributed across the second electrically conductive layer.

4. The battery of claim 3, wherein at least some adhesive regions of the plurality of isolated adhesive regions have a similar size and shape.

5. The battery of claim 1, wherein each adhesive region of the plurality of discontinuous adhesive regions are spaced apart from each other by a gap extending around a perimeter of each adhesive region.

6. The battery of claim 5, wherein each adhesive region of the plurality of discontinuous adhesive regions is equally spaced from each other.

7. The battery of claim 1, wherein the first electrically conductive layer is an anode current collector.

8. The battery of claim 1, wherein at least one adhesive region of the plurality of adhesive regions includes an electrically conductive material.

9. A battery, comprising:
a first electrically conductive layer; and
a second electrically conductive layer adhered and electrically coupled to the first electrically conductive layer via a plurality of adhesive regions extending through the first electrically conductive layer, wherein each adhesive region is spaced apart from adjacent adhesive regions.

10. The battery of claim 9, wherein the plurality of adhesive regions is distributed across the second electrically conductive layer.

11. The battery of claim 9, wherein each adhesive region of the plurality of adhesive regions is spaced apart from adjacent adhesive regions by a gap that extends around a perimeter of each adhesive region.

12. The battery of claim 11, wherein at least some adhesive regions of the plurality of adhesive regions have a similar size and shape.

13. The battery of claim 9, wherein each adhesive region of the plurality of adhesive regions are equally spaced from each other.

14. The battery of claim 9, wherein the first electrically conductive layer is an anode current collector.

15. The battery of claim 9, wherein at least one adhesive region of the plurality of adhesive regions includes an electrically conductive material.

16. A battery, comprising:
a first electrically conductive layer; and
a second electrically conductive layer; and a plurality of discontinuous adhesive regions extending through the first electrically conductive layer, wherein the second electrically conductive layer is electrically coupled to the first electrically conductive layer via the plurality of discontinuous adhesive regions.

17. The battery of claim 16, wherein the plurality of discontinuous adhesive regions includes a plurality of isolated adhesive regions distributed across the second electrically conductive layer.

18. The battery of claim 17, wherein at least some adhesive regions of the plurality of isolated adhesive regions have a similar size and shape.

19. The battery of claim 16, wherein each adhesive region of the plurality of discontinuous adhesive regions are equally spaced from each other.

20. The battery of claim 16, wherein at least one adhesive region of the plurality of discontinuous adhesive regions includes an electrically conductive material.

* * * * *